(12) United States Patent
Drnevich et al.

(10) Patent No.: US 8,007,761 B2
(45) Date of Patent: Aug. 30, 2011

(54) CARBON DIOXIDE EMISSION REDUCTION METHOD

(75) Inventors: Raymond Francis Drnevich, Clarence Center, NY (US); Minish Mahendra Shah, E. Amherst, NY (US); Vasilis Papavassiliou, Williamsville, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 12/343,721

(22) Filed: Dec. 24, 2008

(65) Prior Publication Data

US 2010/0158776 A1 Jun. 24, 2010

(51) Int. Cl.
*C01B 3/26* (2006.01)

(52) U.S. Cl. ............... 423/652; 423/220; 423/242.1; 423/644; 423/648.1; 423/650; 423/651

(58) Field of Classification Search ............. 423/220, 423/242.1, 644, 648.1, 650, 651, 652
See application file for complete search history.

(56) References Cited

U.S. PATENT DOCUMENTS

| 4,475,929 | A | * | 10/1984 | Fuderer | 95/97 |
| 4,869,894 | A | | 9/1989 | Wang et al. | |
| 5,203,888 | A | * | 4/1993 | Maurer | 95/101 |
| 5,310,506 | A | * | 5/1994 | Supp et al. | 252/373 |
| 7,037,485 | B1 | | 5/2006 | Drnevich et al. | |
| 7,094,275 | B2 | * | 8/2006 | Keefer et al. | 96/125 |
| 2004/0018144 | A1 | * | 1/2004 | Briscoe | 423/652 |
| 2006/0104896 | A1 | * | 5/2006 | Drnevich et al. | 423/648.1 |
| 2007/0010590 | A1 | * | 1/2007 | Abbott et al. | 518/703 |
| 2007/0232706 | A1 | | 10/2007 | Shah et al. | |
| 2008/0152966 | A1 | * | 6/2008 | Lee et al. | 429/13 |
| 2010/0083666 | A1 | | 4/2010 | Brook et al. | |

FOREIGN PATENT DOCUMENTS

EP  1 944 268 A1  7/2008

OTHER PUBLICATIONS

Phillips, G., "CO2 Management in Refineries", Gasification V, Noordwijk, Holland, 2002.

(Continued)

*Primary Examiner* — Jessica L Ward
*Assistant Examiner* — Paul A Wartalowicz
(74) *Attorney, Agent, or Firm* — David M. Rosenblum

(57) ABSTRACT

Carbon dioxide emissions within a refinery are reduced by reforming a hydrocarbon containing feed at low pressure to enhance the conversion of methane to hydrogen and carbon monoxide and thereby reduce methane slip. The hydrocarbon containing feed is composed entirely or at least in part of a refinery off gas. The resulting reformed stream is then subjected to water-gas shift conversion to form a shifted stream from which carbon dioxide is separated. As a result of the separation and the low pressure reforming, hydrogen containing fuel gas streams, that are thereby necessary lean in carbon dioxide and methane, are used in firing the steam methane reformer and other fuel uses within the refinery to reduce carbon dioxide emissions. The carbon dioxide that is separated can be sequestered or used in other processes such as enhanced oil recovery.

7 Claims, 4 Drawing Sheets

OTHER PUBLICATIONS

Simmonds, et al., "A Study of Very Large Scale Post Combustion CO2 Capture at a Refining and Petrochemical Complex"; Greenhouse Gas Control Technologies, Proceedings of the 6th International Conference on Greenhouse Gas Control Technologies, Kyoto, Japan, Oct. 1-4, 202 (2003), Meeting Date 2002, vol. 1, 39-44; Editor: Gale, John; Kaya, Yoichi; Publisher: Elsevier Ltd., Oxford, UK.

Middleton et al., "Hydrogen Prduction with CO2 Capture using Membrane Reactors"; Hydrogen Planet, World Hydrogen Energy Conference, 14th, Montreal, QC, Canada, Jun. 9-13, 2002 (2003), Meeting Date 2002, 1523-1534; Publisher: Canadian Hydrogen Association, Montreal, Quebec.

* cited by examiner

CARBON DIOXIDE EMISSION REDUCTION METHOD

FIELD OF THE INVENTION

The present invention relates to a method of reducing carbon dioxide emissions within a refinery in which fuel gas streams are produced by reforming a hydrocarbon containing stream, composed all or in part of a refinery off gas, at low pressure to reduce methane slip and separating carbon dioxide from a reformed stream subjected to one or more water-gas shift reactors. More particularly, the present invention relates to such a method in which one of the fuel streams is used in firing the reformer and the other of the fuel streams is returned to the refinery fuel header.

BACKGROUND OF THE INVENTION

Steam methane reforming of a hydrocarbon containing feed is practiced to produce hydrogen for such refinery uses as hydrotreating and hydrocracking. As a result, steam methane reformers are operated in connection with fuel refining facilities. A variety of off gas streams are produced in refineries from processes such as fluidic catalytic cracking, coking, catalytic reforming, hydrocracking and etc. Generally, all these streams are used for fuel in process heaters and in steam generators for making steam.

However, as may be appreciated, the combustion of fuels produces carbon dioxide. The production of carbon dioxide is seen as a contributor to greenhouse gases and potential climate change. Consequently, there has been a worldwide effort to reduce greenhouse gases that includes reducing the production of carbon dioxide in the atmosphere. As indicated in Philips "$CO_2$ Management in Refineries", Foster Wheeler Energy Limited (2002), process heaters produce roughly half of the carbon dioxide that is emitted from refinery operations to the atmosphere as greenhouse gases. As indicated in this paper, the gasification of refinery off gases could be used to produce fuels and hydrogen that would allow for a relatively easy capture of half the carbon dioxide emissions in the refinery. The captured carbon dioxide could be used in enhanced oil recovery processes.

In Simmonds et al., "A study of very large scale post combustion carbon dioxide capture at a refining and petrochemical complex", it has been proposed to gather flue gas produced in the refinery and then capture the carbon dioxide in a carbon dioxide capture plant to sequester the carbon dioxide for later use. It is proposed in this reference to capture the carbon dioxide by a duct network of approximately 2 kilometers in length and having a maximum cross-sectional area of 9 square meters. It is envisioned in this paper that the carbon dioxide be captured through the use of amine scrubbing units.

Another source of carbon dioxide emissions is the steam methane reformer itself. A steam methane reformer produces a synthesis gas in which hydrogen can be separated or used in down stream chemical processes. Such down stream processes include the production of methanol and gas to liquid processes for synthetic fuels by means of the Fischer-Tropsch process. In any case, syntheses gas is generated within a steam methane reformer by introducing a hydrocarbon containing feed, typically natural gas, into reformer tubes located within a radiant section of the steam methane reformer. The reformer tubes contain a catalyst to promote the steam methane reforming reactions in which steam is reacted with the hydrocarbons to produce hydrogen, carbon monoxide, water and carbon dioxide. The resulting reformed stream is further reacted within one or more water-gas shift reactors in which the hydrogen content is increased by reacting carbon monoxide with steam. This results in additional carbon dioxide being formed. Typically, the resulting shifted stream is cooled and then introduced into a pressure swing adsorption unit in which the hydrogen is separated. Such separation of the hydrogen results in a tail gas stream being produced that contains hydrogen, methane, carbon monoxide, and carbon dioxide. The tail gas stream is used in part in firing the burners of the reformer and also in process steam heaters for raising steam that is used in the steam methane reforming reaction. All of this combustion adds to the carbon dioxide emissions of the facility.

In U.S. patent application Ser. No. 2007/0232706 A1, it has been proposed to capture the carbon dioxide in the shifted stream by first separating carbon dioxide in a vacuum pressure swing adsorption unit in which the adsorbent adsorbs the carbon dioxide to produce a hydrogen-rich stream that is introduced into the pressure swing adsorption unit. During desorption of the adsorbent, a carbon dioxide-rich stream is produced that is further processed by being compressed, cooled, dried, purified and then subjected to a sub-ambient temperature distillation process within a distillation column. Resulting bottoms liquid is vaporized within a main heat exchanger that is used in connection with the sub-ambient temperature distillation process to produce a carbon dioxide-rich stream that can be further compressed and used for down stream processes, for example, enhanced oil recovery or sequestered. Carbon dioxide lean vapor that is produced as a result of the distillation can be warmed and recycled back to the pressure swing adsorption unit for further processing along with the incoming synthesis gas feed.

Refinery off gases are a hydrocarbon containing stream that could potentially be reformed in a steam methane reformer. However, such streams often have a high olefin content that will deactivate the catalyst within the steam methane reformer. In U.S. Pat. No. 7,037,485, it is disclosed that such a refinery off gas stream can be compressed and treated within a guard bed to remove metal and sulfur species and then either alone or combined with natural gas introduced into a reactor to catalytically react the hydrogen with the hydrocarbons and any sulfur compounds to form saturated hydrocarbons and hydrogen sulfide. If the incoming stream does not contain sufficient hydrogen, hydrogen can be recirculated from the pressure swing adsorption unit. Alternatively, an oxygen stream can also be added to react with the hydrocarbons, the hydrogen and sulfur compounds contained within the feed so that additional hydrogen and carbon monoxide are produced. The resultant stream can then be passed into sulfur removal beds such as a zinc oxide bed to remove hydrogen sulfide and the resulting stream can then be combined with steam and safely reacted within the steam methane reformer.

As will be discussed, the present invention provides a method of reducing carbon dioxide emissions within a refinery that, among other advantages, does not require complex piping networks to gather flue gas and does not produce a carbon dioxide-rich tail gas as dioxide that is separated in accordance with the present invention is thereby sequestered from the fuel and is available for other processes such as enhanced oil recovery.

SUMMARY OF THE INVENTION

The present invention provides a method of reducing carbon dioxide emissions in a refinery. In accordance with the method, a refinery off gas stream is obtained upstream from a fuel header and down stream from a sulfur removal unit within the refinery. A reacted stream is then produced from a heated hydrocarbon containing stream composed at least in part of the refinery off gas stream by catalytically reacting hydrogen with hydrocarbons and the residual sulfur compounds present within the hydrocarbon containing stream without oxygen so that the reacted stream contains saturated hydrocarbons and hydrogen sulfide formed from hydrogenation of the hydrocarbons and the sulfur compounds, respectively. Alternatively, catalytic reaction can take place between oxygen, steam and the hydrocarbons and the hydrogen with the sulfur compounds so that the reacted stream contains additional hydrogen, saturated hydrocarbons, carbon monoxide, and the hydrogen sulfide.

The reacted stream is cooled and the hydrogen sulfide is adsorbed within the reacted stream to produce a treated reacted stream that is combined with a steam stream to produce a reactant stream. A reformed stream is formed that comprises hydrogen, carbon monoxide, steam and carbon dioxide. The reformed stream is formed, at least in part, by subjecting the reactant stream to steam methane reforming in a steam methane reformer fired by a fuel. The steam methane reforming is carried out at a pressure of between about 125 psia and about 300 psia and no less than about 50 psia and about 150 psia above fuel header pressure of the refinery fuel header and preferably, between about 75 psia and about 110 psia above the refinery fuel header pressure. Further, the steam methane reforming is conducted with a steam to carbon ratio of between about 2.0 and about 3.5 thereby to produce reaction products from the steam methane reforming having a methane content of no greater than about 2.0 mol %.

The carbon monoxide and steam contained in the reformed stream is reacted in at least one water-gas shift reactor such that a shifted stream is produced having a hydrogen and carbon dioxide content greater than that of the reformed stream.

Carbon dioxide is separated from the shifted stream to produce a carbon dioxide containing gas stream and a hydrogen containing gas stream. A first hydrogen containing fuel gas stream and a second hydrogen containing fuel gas stream are produced from the hydrogen containing gas stream. The first hydrogen containing fuel gas stream is returned to the refinery fuel gas header and the second hydrogen containing fuel gas stream is utilized to supply at least part of the fuel to the steam methane reformer.

As can be appreciated from the above discussion, since the fuel gas to thereby be utilized in the refinery contains appreciably less carbon dioxide content, the resulting carbon dioxide emissions from the refinery will be reduced. Furthermore, since the steam methane reforming is carried out at a reduced pressure as compared with a conventional steam methane reforming operation there will be a lower degree of methane slip and therefore, less carbon in the hydrogen containing fuel gas streams to create carbon dioxide upon combustion of such fuel.

The reacted stream is preferably formed by contacting the hydrogen, the hydrocarbons and the sulfur compounds or alternatively, the oxygen, the steam, the hydrocarbons, the hydrogen and the sulfur compounds with a catalyst capable of promoting both hydrogenation and partial oxidation reactions. Additionally, the carbon monoxide and steam contained in the reformed stream is preferably reacted in a high temperature water-gas shift reactor and a low temperature water-gas shift reactor in flow communication with the high temperature water-gas shift reactor. In such case, the hydrocarbon containing stream can be heated through indirect heat exchange with a partly shifted stream discharged from the high temperature water-gas shift reactor to the low temperature water-gas shift reactor.

Carbon dioxide production can be increased by introducing a reformed product stream discharged from the steam methane reformer into a secondary reformer with oxygen. The methane content of the reformed product stream can then be converted to yet additional hydrogen and carbon monoxide in the secondary reformer, thereby to produce the reformed stream.

In a specific embodiment of the present invention, the carbon dioxide can be separated from the shifted stream by counter-currently contacting the shifted stream with an amine based solvent within an adsorption column, thereby to produce the hydrogen containing gas stream and carbon dioxide laden solvent. The carbon dioxide is stripped from the carbon dioxide laden solvent within a stripping column to produce the carbon dioxide containing gas stream and regenerated solvent for use in the absorption column. The resulting hydrogen containing gas stream is dried and then separated into the first hydrogen containing fuel gas stream and the second hydrogen containing fuel gas stream.

BRIEF DESCRIPTION OF THE DRAWINGS

While the present invention concludes with claims distinctly pointing out the subject matter that Applicants regard as their invention, it is believed that the invention will be better understood when taken in connection with the accompanying drawings in which:

DETAILED DESCRIPTION

Figure 1:
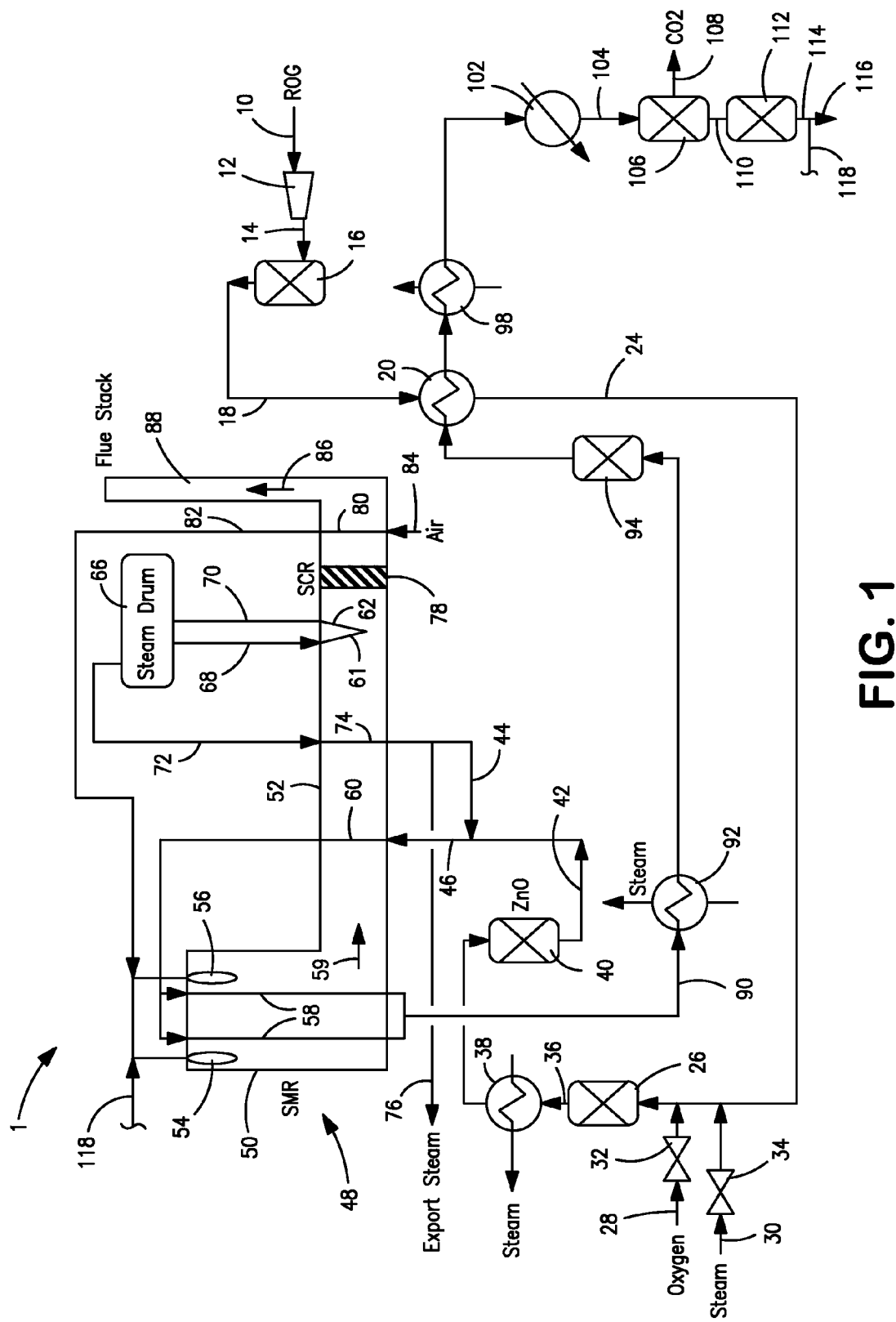
FIG. 1 is a schematic diagram of a steam methane reforming installation to carry out a method in accordance with the present invention.

With reference to FIG. 1, a steam methane reforming installation 1 is illustrated in which a hydrocarbon containing stream to be reformed by steam methane reforming originates as in incoming refinery off gas stream 10 that is obtained upstream from a refinery fuel gas header and down stream from a sulfur removal unit that is typically an amine system known in the art. It is understood, however, that this is for purposes of illustration only and in fact, natural gas could be mixed with the refinery off gas stream 10 and then same could be processed as described hereinbelow.

Refinery off gas stream 10 could be a fluidic catalytic cracker off gas, a sweet refinery gas, a coker off gas or other type of off gas containing high amounts of hydrocarbons with two or more carbon atoms. Typically, a refinery off gas stream will contain no less than about 50% by volume on a dry basis of hydrocarbons and/or at least 3% by volume of olefins. Typical compositions of such streams are, however, well known and they vary widely depending on refinery configurations and modes of refinery operation. The sulfur content of such feed streams can range from between about 5 parts per million and about 200 parts per million and the sulfur content will be divided between mercaptans, and hydrogen sulfide.

Refinery off gas stream 10 is compressed in a compressor 12 to produce a compressed refinery off gas stream 14. Typical refinery off gas is available at a pressure of less than about 100 psig such that the compression is required to overcome the pressure drop associated with the processing of the gas. Assuming that the hydrogen containing fuel gas stream to be produced is to be utilized at the same pressure, then, the discharge pressure of compressor 12 will be between about 200 psig to about 300 psig. The aim here is to conduct the steam methane reforming, to be discussed, at a pressure of between about 125 psia and about 300 psia and no less than about 50 psia and about 150 psia above fuel header pressure of the fuel header so that a low carbon content hydrogen containing fuel gas stream can be returned to the header.

Thereafter, the compressed refinery off gas stream is then introduced into a guard bed 16 containing a known sorbent that is typically iron based and that is used to reduce sulfur species to less than about 25 parts per million and heavy metals. The resultant treated, compressed refinery off gas stream 18 is then preheated within a feed heater 20 to a temperature of no greater than about 900° F. to avoid cracking of higher order hydrocarbons that are contained within such stream. The resulting heated refinery off gas stream 24 is then introduced into a catalytic reactor 26 together with oxygen stream 28 and steam stream 30 as necessary. Shutoff valves 32 and 34 are provided to control the addition of oxygen and steam.

Catalytic reactor 26 has two modes of operation. In a first hydrogenation mode of operation, valves 32 and 34 are normally closed. However, valve 34 may be open to control temperatures within catalytic reactor 26 particularly in the case with the refinery off gas stream 10 has a high concentration of olefins.

In the catalytic hydrogenation mode of operation, saturated rated hydrocarbons will be produced from olefins present in the feed and also sulfur compounds, such as carbonyl sulfide, mercaptans, thiophenes and other organic sulfur species will be reduced to hydrogen sulfide for further treatment. The hydrogen reacts with higher order hydrocarbons and the olefins to preferably produce a reacted stream 36 at a temperature of greater than about 400° C.

During a catalytic oxidative mode of operation both valves 32 and 34 are set in open positions to produce an oxygen to carbon ratio of less than about 0.25 and a steam to carbon ratio of less than 1.0. The oxygen stream 28 can be air, oxygen enriched air or other oxygen containing gas and is preferably an oxygen enriched stream containing oxygen in an amount of about 85% by volume and greater. The hydrocarbons contained within the heated refinery off gas stream 24 react with oxygen and steam to produce reacted stream 36 with a hydrocarbon content that preferably consists of methane, less than 0.5% olefins by volume on a dry basis, less than 10% of alkanes with two or more carbon atoms on a dry basis, no more than about 1% by volume on a dry basis of hydrocarbons other than alkanes and olefins and a remaining content comprising hydrogen, carbon monoxide, carbon dioxide and water. Sulfur species are also chemically reduced to hydrogen sulfide. Oxygen 28 is fed in a sufficient amount such that the reacted stream 36 has a temperature of between about 500° C. and about 860° C.

The catalyst contained within catalytic reactor 26 has to be able to function in a hydrogenation mode and a partial oxidation mode. Useful catalysts can be obtained from Sud-Chemie of Louisville, Ky. United States of America, which is in the form of a monolith which is sold as PC-POX 1 on FeCrAlY. Similar catalysts from other suppliers may be used. Typical residence time within a reactor having a catalyst capable of both hydrogenation and partial oxidation activity should be selected to produce space velocities ranging from at least about 10,000 to about 100,000 hours-1.

The operation of catalytic reactor is fully described in U.S. Pat. No. 7,037,485, owned by assignee herein. However, it is to be noted that the present invention is not limited to such a reactor in that assuming a proper feed composition, for example, one having a low concentration of alkanes with two or more carbon atoms, the same effect might be able to be obtained in a hydrotreater. Moreover, two specially designed hydrogenation and partial oxidation reactors are possible with switching between the reactors.

Reacted stream 36 is then cooled within a heat exchange/boiler system 38 to a temperature of about 700° F. to raise steam and then is introduced into another sulfur removal bed 40, preferably a zinc oxide bed, to form a treated reacted stream 42 that is then combined with a superheated steam stream 44 to produce a reactant stream 46 that serves as a feed to a steam methane reformer 48 ("SMR").

Steam methane reformer 48 has a radiant section 50 and a convective section 52. Burners 54 and 56 fire into radiant section 50 to heat reactor tubes 58. As is known in the art, in any steam methane reformer multiple burners 54 and 56 would be provided as well as several hundred of the reactor tubes 58.

Reactor tubes 58 are fed by the reactant stream 46 after reactant stream 46 has been heated within convective section 52 of steam methane reformer 50. In this regard, a flue gas stream 59 is produced by the combustion occurring within radiant section 50 that is then used to heat reactant stream 46 within a heat exchanger 60 located within convective section 52. Further heat exchangers 61, 62 and 64 are also provided within convective section 52 to raise steam and then to superheat the steam. The steam is raised within a steam drum 66 by passing a boiler feedwater stream 68 into heat exchangers 61 and 62 to produce a steam containing stream 70 that is fed back into steam drum 66. In addition, the steam raised within steam generation units, such as steam generation unit 38, could also be fed to steam drum 66. Steam drum 66 is fed with heated boiler feedwater in a manner that will be discussed and that, in any case, is conventional. The resultant steam is fed as a steam stream 72 into steam superheater 64 to produce superheated steam stream 74 that is divided into superheated steam stream 44 and an export steam stream 76. If an amine unit is used for carbon dioxide separation some of the export steam could be used to drive the amine regeneration.

Flue gas stream 59 then passes to selective catalytic reduction unit 78 ("SCR") for removal of nitrogen oxides. The treated flue gas then passes through combustion air heater 80 to produce a heated combustion air stream 82 from an air feed stream 84. The flue gas then is discharged as a stack gas 86 from flue stack 88. As will be discussed, heated combustion air stream 82 supports combustion of the fuel that is used in firing burners 54 and 56.

As known in the art, the reaction of the steam and the hydrocarbons within catalyst-filled reaction tubes 58 produce a reformed stream 90 that contains steam, hydrogen, carbon monoxide and carbon dioxide and a small amount of methane known as methane slip. In accordance with the present invention and as indicated above, the steam methane reforming operational conditions are at a pressure of between about 125 psia and about 300 psia and a steam to carbon ratio of about 2.0 and about 3.0. Since it is a purpose of the present invention to return a hydrogen containing fuel, lean in carbon dioxide, carbon monoxide, and hydrocarbons to the refinery fuel header, the steam methane reforming should be conducted at a pressure of between about 50 psia and about 150 psia above the fuel header pressure and preferably, between about 75 psia and about 110 psia above the refinery fuel header pressure.

The lower pressure contemplated by the present invention maximizes the conversion of methane into hydrogen and carbon monoxide and will ensure that the methane concentration within reformed stream 90, also known as methane slip, will be no more than about 2.0 mol % on a wet basis. Typically, steam methane reforming operations are conducted at a pressure of about 350 to about 450 psia and under such circumstances the methane slip is typically about 3 mol. % on a wet basis. The steam to carbon ratio will be selected in dependence upon the actual feed in a manner well known in the art that will favor hydrogen production. However, such ratio will not have a major effect on the degree of conversion that can be obtained given the low operational pressures contemplated by the present invention. As can be appreciated, the more complete conversion of methane will result in less methane being present within the fuel to be created in accordance with the present invention and therefore lower carbon dioxide emissions upon the combustion of such fuel. In this regard, a typical composition of reformed stream 90 would be less than 1 mole % on a wet basis. This is to be compared with a typical composition of a reformed stream in a steam methane reformer operating at conventional pressures which would contain more than 3 mole % on a wet basis.

Reformed stream 90 is then cooled in a process steam heater 92, that can also be used to raise steam for steam drum 66, to a temperature of about 600° F. and is then introduced into a high temperature shift conversion unit 94. High temperature shift conversion units typically have an inlet temperature from between about 550° F. to about 700° F. In high temperature shift conversion unit 94, reformed stream 90 is subjected to known water-gas shift reactions in which steam is reacted with carbon monoxide to produce a shifted stream 96 that contains additional hydrogen and carbon dioxide over the reformed stream 90. A typical hydrogen to carbon monoxide molar ratio of shifted stream 96 would be about 15.

The shifted stream 96 is introduced into feed heater 20 to form the heated refinery off gas stream 24. The shifted stream 96, that has thus been cooled to a temperature of about 330° F. is then passed through a boiler feed water heater 98. Thereafter, shifted stream 96 is then cooled to about ambient temperature in a cooler 102 by indirect heat exchange with air or water to produce an ambient temperature shifted stream 104.

Carbon dioxide is then removed from the ambient temperature shifted stream 104 in an amine absorption unit 106 to produce a carbon dioxide containing gas stream 108 of about 99 mole % purity and a hydrogen containing gas stream 110. Hydrogen containing gas stream 110 is then passed through a dryer 112 that can be a temperature swing adsorption unit. As well known in the art, such a unit has beds of adsorbent, typically alumina, that are operated in an out of phase cycle so that while one bed is adsorbing moisture, the other bed is regenerated by subjecting it to a higher temperature and lower pressure than the on-line bed. The removal of moisture produces a dry hydrogen containing gas stream 114 that can be divided into a first hydrogen containing fuel stream 116 and a second hydrogen containing fuel stream 118. Dry hydrogen containing gas stream 114 would have a composition as follows: ~92 mole % hydrogen, about 5 mole % carbon monoxide, 2 mole % carbon dioxide, about 0.7 mole % methane, and about 0.3% nitrogen based on a 90% carbon dioxide removal efficiency. First hydrogen containing fuel stream 116 is fed directly back to the fuel header of the refinery. Second hydrogen containing fuel stream 118 is fed back to the steam methane reformer 48 to serve as preferably all of the fuel to the burners 54 and 56. In this regard, some natural gas might have to be used as burner fuel depending on burner characteristics. In this regard, second hydrogen containing fuel stream 118 may therefore serve as part of the fuel to the steam methane reforming unit 48. Using any natural gas as burner fuel is less preferred in that more carbon dioxide would be expelled into the ambient. A further point is that second hydrogen containing fuel stream 118 could be taken before dryer 112 and thus would contain more moisture than first hydrogen containing fuel gas 116.

The carbon dioxide containing gas stream 108 could be directly sequestered or could be advantageously put to other industrial uses. For such purposes, the carbon dioxide containing gas stream 108 could be compressed by a product compressor and then passed into a pipeline for sequestration or enhanced oil recovery.

As can be appreciated from the above discussion, the use of second hydrogen containing fuel gas stream 118 that has a low concentration of carbon dioxide will result in less carbon dioxide emissions in stack gas stream 86. The same would hold true with respect to use of first hydrogen containing fuel gas stream 116 in providing fuel to the rest of the refinery. Thus, it can be seen that steam methane reformer 48 is in effect being utilized to convert the refinery off gas stream 10 to a hydrogen containing off gas stream that is lean in carbon containing species and that can be used throughout a refinery facility with reduced carbon dioxide emissions.

Figure 2:
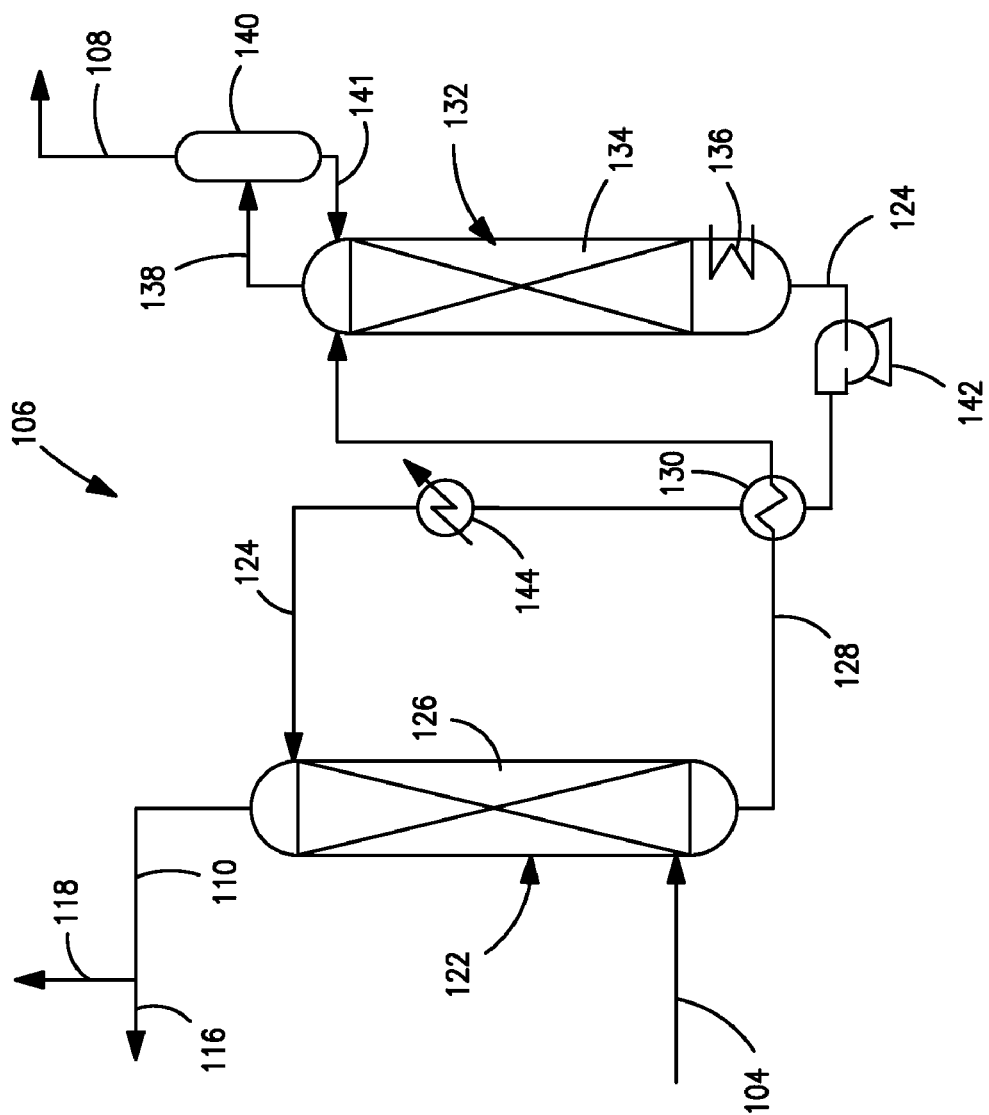
FIG. 2 illustrates an amine unit that is used to move carbon dioxide from the shifted stream prior to forming the hydrogen containing fuel gas stream.

With reference to FIG. 2, in amine unit 106, the ambient temperature shifted stream 104 is introduced into an absorption column 122 that is designed to use the amine based solvent. The amine based solvent is introduced as a regenerated solvent stream 124 into the top section of absorption column 122. Within column 122 are a set of mass-transfer contact elements 126 are provided to cause descending solvent to contact the ascending carbon dioxide and hydrogen containing vapor phase that is introduced by way of the ambient temperature shifted stream 104 through a bottom section of absorption column 122. Such mass-transfer contact elements can be trays or packing. As the result of the contact between such vapor phase and the solvent, a hydrogen-rich gas is formed as a column overhead within absorption column 122 and a carbon dioxide-rich liquid is formed as a liquid column bottoms within absorption column 122. The hydrogen containing gas stream 110 is extracted from a top section of absorption column 122 and is made up of the hydrogen containing column overhead of absorption column 122. As the solvent descends within absorption column 122 it becomes evermore richer in carbon dioxide to form a carbon dioxide-rich liquid as a liquid column bottoms that is extracted as a rich liquid stream 128.

Preferably, the temperature of absorption column 122 is maintained at between 100° F. to about 170° F. The operating pressure of the absorption column 122 is maintained at the same level as the incoming feed of the hydrogen containing gas stream 96. Most of the carbon dioxide contained within the hydrogen and carbon dioxide containing gas stream 96 is absorbed within the solvent.

The solvent loaded with carbon dioxide can be passed as the rich liquid stream 128 to a regeneration zone to regenerate the solvent and thereby to produce the carbon dioxide that has thus been separated from the incoming feed. This is accomplished by introducing rich liquid stream 128 through a heat exchanger 130 and then introducing the rich liquid stream 128 into a near ambient pressure stripping column 132. The remaining liquid loaded with solvent, descends within mass-transfer contact elements 134 provided within stripping column 132 to produce another liquid column bottoms. A heater 136 heats such liquid column bottoms without boiling the same to produce an ascending vapor that will displace and hence, strip carbon dioxide from the liquid to produce the carbon dioxide as a column overhead. A column overhead stream 138 is extracted and introduced into knock-out drum 140 to separate the carbon dioxide from any solvent. Such separated solvent is introduced as a reflux stream 141 back into stripping column 132 and into mass-transfer contact elements 134 to wash down any solvent that may be present within the carbon dioxide column overhead. The carbon dioxide containing gas stream 108 that results from the foregoing can be utilized as described above.

The regenerated solvent contained in the liquid column bottoms within stripping column 132 is extracted as regenerated solvent stream 124 which is pumped by a pump 142 back to the pressure of adsorption column 126, cooled within heat exchanger 130 and then passed through a cooler 144 and the absorption column 126.

The use of such a system is but one way to separate the carbon dioxide. For example, carbon dioxide could be separated in the manner shown in U.S. patent application Ser. No. 2007/0232706 A1. In accordance with this published patent application, the shifted stream 96 could be introduced into a carbon dioxide vacuum pressure swing adsorption unit which employs absorbent beds that contain an absorbent, such as alumina, to absorb the carbon dioxide from the shifted stream 96. The adsorption would produce a carbon dioxide containing gas stream and a hydrogen-rich stream that could be used in forming the first and second hydrogen containing fuel gas streams 116 and 118. The carbon dioxide containing gas stream could then be further processed in a sub-ambient temperature distillation column system to produce a carbon dioxide stream to be taken as a product.

Figure 3:
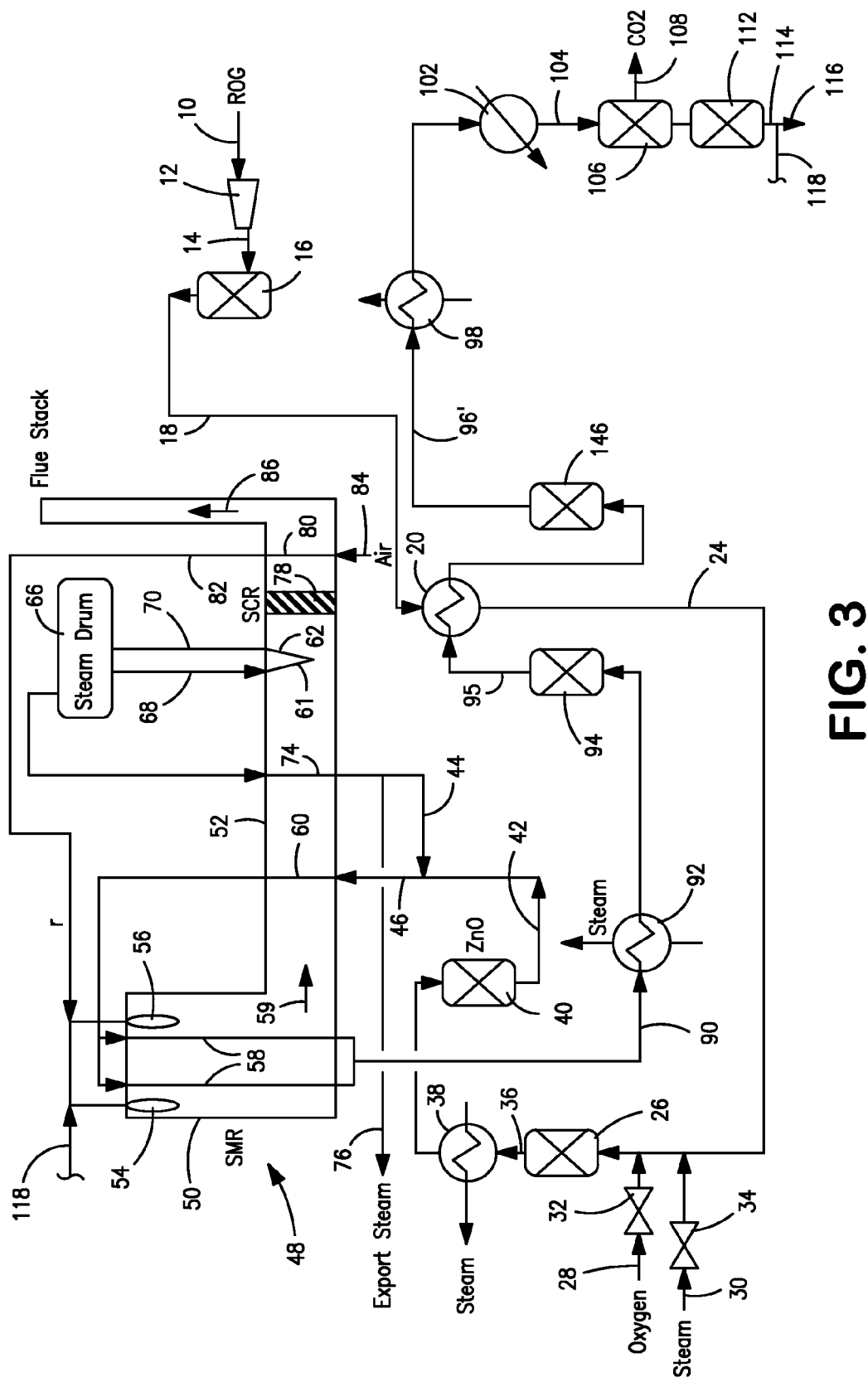
FIG. 3 illustrated an alternative embodiment of FIG. 1.

With reference to FIG. 3, in an alternative embodiment, a partly shifted stream 95 from the first high temperature shift conversion unit 94 after feed heater 20 can be fed to a low temperature shift conversion unit 146 at a temperature of between about 350° F. and about 450° F. Boiler feed water heaters or low pressure steam generators could be used in lieu of feed heater 20. As can be appreciated, the partly shifted stream 95 will invariably contain steam and carbon monoxide that can be reacted in the low temperature shift conversion unit 146 to increase the hydrogen and carbon dioxide content to be further processed in a shifted stream 96' discharged from such unit. In this regard, the hydrogen to carbon monoxide molar ratio of shifted stream 96' is about 70. The embodiment shown in this figure otherwise functions in the same manner as that shown in FIG. 1.

Figure 4:
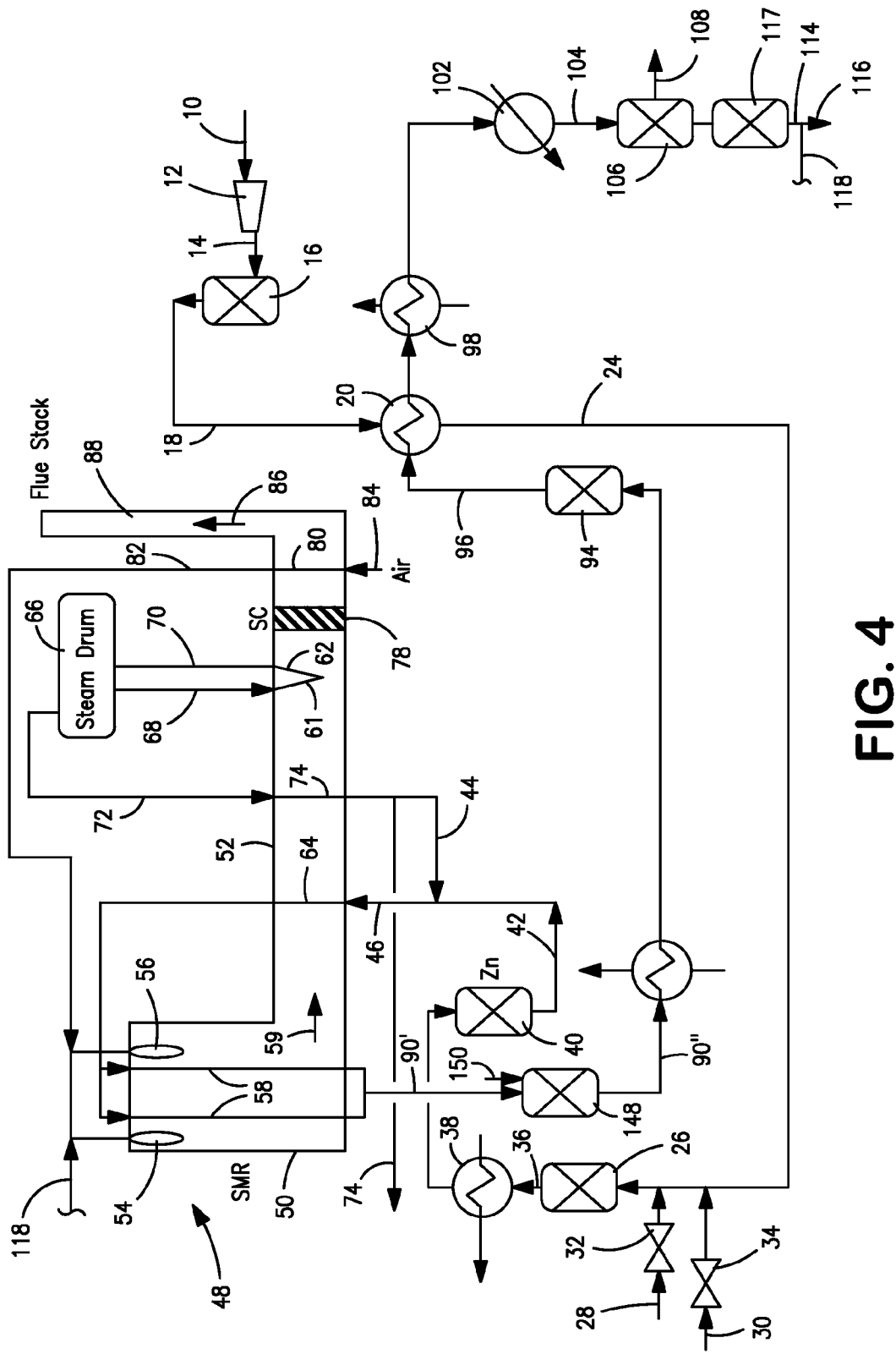
FIG. 4 illustrates an alternative embodiment of FIG. 1.

FIG. 4 illustrates a yet further embodiment of FIG. 1 that is designed to decrease the amount of methane that is present within the hydrogen containing fuel gas streams 116 and 118 and therefore, the amount of carbon dioxide emissions created upon combustion of such fuel. In this embodiment, a secondary reformer 148 is used. Such a reformer as well known in the art utilizes a burner firing into a catalyst bed. An oxygen containing stream 150 is provided to support such combustion. In such embodiment, the reformed product stream 90' of the steam methane reformer 48 is introduced into the secondary reformer to convert the methane content thereof to produce additional hydrogen, carbon monoxide and carbon dioxide to produce a reformed stream 90". The additional hydrogen and carbon monoxide within reformed stream 90" is then reacted in the down stream shift conversion unit 94 to produce additional hydrogen and carbon dioxide.

The following Table illustrates simulated examples to illustrate possible operational comparisons of carbon dioxide emissions to be obtained in the prior art (Cases 1 and 2) and the present invention (Cases 3 and 4. In the Table, Case 1 is an illustration of refinery carbon dioxide emissions that would be obtained from the combustion of a typical hydrocarbon containing gas stream. Natural gas was chosen as a surrogate for refinery gas. Case 2 illustrates that carbon dioxide emissions that would take place in a refinery using hydrogen as a fuel that is produced from a conventional steam methane reformer operating at between about 350 psia and about 450 psia with carbon dioxide removal before the pressure swing adsorption unit for production of the hydrogen. Case 3 and Case 4 are expected results of the present invention conducted in accordance with FIGS. 1 and 2, respectively. Case 4 shows that the configuration shown in FIG. 3 emits 72% less carbon dioxide when the hydrogen-rich fuel is burned in the refinery than when a typical hydrocarbon containing gas stream is burned. In addition, if all the export steam can be used to offset burning of a typical hydrocarbon containing gas to produce that steam, the actual avoided carbon dioxide emissions is nearly 85% less than the typical emission levels for burning hydrocarbon containing gases.

TABLE

|  | Case Number | | | |
|---|---|---|---|---|
|  | 1 | 2 | 3 | 4 |
|  | Fuel | | | |
|  | Natural Gas | Hydrogen | Hydrogen containing fuel gas (FIG. 1) | Hydrogen containing fuel gas (FIG. 3) |
| Steam to carbon ratio in steam methane reformer | — | 2.8 | 2.8 | 2.8 |
| Steam Methane Reformer Feed Pressure, Psia | — | 415 | 185 | 185 |
| $CO_2$ Emitted, lb mole/h from steam methane reformer, boilers and fired heaters within a refinery based upon the Fuel Gas Flows below Fuel Gas Flow, lb mole/h to refinery for boilers and fired heaters | 2,798.2 | 1,445.3 | 1,224.6 | 555.8 |
| $H_2$ |  | 7,697.2 | 6,708.4 | 6,264.7 |
| $O_2$ |  |  |  |  |
| $N_2$ |  | 8.3 | 5.6 | 4.9 |
| $H_2O$ |  |  | 112.5 | 103.9 |
| CO |  |  | 449.9 | 89.8 |
| $CO_2$ |  | 13.8 | 134.7 | 150.3 |

TABLE-continued

| | Case Number | | | |
|---|---|---|---|---|
| | 1 | 2 | 3 | 4 |
| | Fuel | | | |
| | Natural Gas | Hydrogen | Hydrogen containing fuel gas (FIG. 1) | Hydrogen containing fuel gas (FIG. 3) |
| $CH_4$ | 2,704.2 | | 72.8 | 64.6 |
| $C_2H_6$ | 35.9 | | 0.0 | 0.0 |
| $C_3H_8$ | 2.8 | | | |
| Total, lbmoles/h | 2,765.0 | 7,697.2 | 7,483.8 | 6,678.2 |
| Fuel Gas Flow, MMBtu (lower heating value)/h | 960.3 | 801.8 | 779.1 | 686.0 |
| Natural Gas Fuel used in steam methane reformer, lb moles/h | | 331.0 | 295.0 | 45.0 |
| $CO_2$ Captured, lb moles/h | — | 1,810.9 | 1,961.3 | 2,282.8 |
| $CO_2$ Captured, lb moles/MM Btu | — | 2.3 | 2.5 | 3.3 |
| $CO_2$ Emitted, lb mole/MMBtu | 2.91 | 1.80 | 1.57 | 0.81 |
| $CO_2$ Emitted, tons/MMBtu | 0.064 | 0.040 | 0.035 | 0.018 |
| $CO_2$ Emitted as a percentage of the $CO_2$ emitted for Case 1 | 100% | 62% | 54% | 28% |
| Steam | | | | |
| Steam Produced, lbs/h for export from steam methane reformer at a pressure of 600 psig and a temperature of 725° F. Steam Enthalpy, Btu/lb = 1364 Water Enthalpy, Btu/lb (100° F.) = 68 Delta Enthalpy, Btu/lb = 1296 | — | 69,065 | 73,461 | 59,206 |
| Total Delta, MM Btu/h of the steam delivered Boiler efficiency = 90% | | 89.51 | 95.21 | 76.73 |
| NG avoided, MM Btu/h | | 99.45 | 105.78 | 85.26 |
| $CO_2$ Avoided in production of Steam, lb moles/h | | 289.78 | 308.23 | 248.42 |
| Avoided $CO_2$ | | | | |
| $CO_2$ Avoided Steam, lb moles/MMBtu in a steam methane reformer that exports steam that is raised by not burning natural gas or ROG | | 0.36 | 0.40 | 0.36 |
| $CO_2$ Avoided Fuel, lb moles/MMBtu replacing refinergy off gas with hydrogen fuel gas (Case 2) and a hydrogen containing fuel gas (Cases 3 and 4) | | 1.11 | 1.34 | 2.10 |
| Total $CO_2$ Avoided, lb moles/MMBtu | | 1.47 | 1.74 | 2.47 |
| Total $CO_2$ Avoided, tons/MMBtu | | 0.032 | 0.038 | 0.054 |
| % $CO_2$ Avoided | | 50.5% | 59.6% | 84.6% |

While the present invention has been described to preferred embodiment, as will occur those skilled in the art, numerous additions, omissions and changes can be made without departing from the spirit and scope of the present invention as set forth in the appended claims.

What is claimed is:

1. A method of reducing carbon dioxide emissions in a refinery comprising:

obtaining a refinery off gas stream upstream from a refinery fuel gas header within the refinery and down stream from a sulfur removal unit;

heating a hydrocarbon containing stream composed at least in part of the refinery off gas stream and producing a reacted stream from the hydrocarbon containing stream by catalytically reacting hydrogen with hydrocarbons and sulfur compounds present within the hydrocarbon containing stream without oxygen so that the reacted stream contains saturated hydrocarbons and hydrogen sulfide formed from hydrogenation of the hydrocarbons and the sulfur compounds, respectively, or alternatively, catalytically reacting oxygen, steam and the hydrocarbons and the hydrogen with the sulfur compounds so that the reacted stream contains additional hydrogen, saturated hydrocarbons, carbon monoxide and the hydrogen sulfide;

cooling the reacted stream, adsorbing the hydrogen sulfide within the reacted stream to produce a treated reacted stream and combining the treated reacted stream with a steam stream to produce a reactant stream;

producing a reformed stream comprising hydrogen, carbon monoxide, steam and carbon dioxide, at least in part, by subjecting the reactant stream to steam methane reforming in a steam methane reformer fired by a fuel;

the steam methane reforming being carried out at a pressure that is in a range of between about 125 psia and about 300 psia and at a steam to carbon ratio of between about 2.0 and about 3.5 thereby to produce reaction products from the steam methane reforming having a methane content of no greater than about 2.0 mol %;

reacting the carbon monoxide and steam contained in the reformed stream in at least one water-gas shift reactor such that a shifted stream is produced having a hydrogen and carbon dioxide content greater than that of the reformed stream and other constituents;

separating carbon dioxide from the shifted stream to produce a carbon dioxide containing gas stream and a hydrogen containing gas stream having a greater concentration of the other constituents than the carbon dioxide containing gas stream;

producing a first hydrogen containing fuel gas stream and a second hydrogen containing fuel gas stream from the hydrogen containing gas stream such that the first hydrogen containing fuel gas stream and the second hydrogen containing fuel as stream each having a composition that is the same as that of the hydrogen containing gas stream; and returning the first hydrogen containing fuel gas stream to the refinery fuel gas header and utilizing the second hydrogen containing fuel gas stream to supply at least part of the fuel to the steam methane reformer.

2. The method of claim 1, wherein the pressure at which the steam methane reforming is carried out is between about 75 psia and about 110 psia above a refinery fuel header pressure of the refinery fuel gas header.

3. The method of claim 1, wherein the reacted stream is formed by contacting the hydrogen, the hydrocarbons and the sulfur compounds or alternatively, the oxygen, the steam, the hydrocarbons, the hydrogen and the sulfur compounds with a catalyst capable of promoting both hydrogenation and partial oxidation reactions.

4. The method of claim 1, wherein:
a reformed product stream is discharged from the steam methane reformer; and
the reformed product stream is introduced into a secondary reformer with oxygen and a methane content of the reformed product stream is converted to yet additional hydrogen and carbon monoxide in the secondary reformer, thereby to produce the reformed stream.

5. The method of claim 1, wherein:
the carbon dioxide is separated from the shifted stream by counter-currently contacting the shifted stream with an amine based solvent within an adsorption column, thereby to produce the hydrogen containing gas stream and carbon dioxide laden solvent and stripping the carbon dioxide from the carbon dioxide laden solvent within a stripping column to produce the carbon dioxide containing gas stream and regenerated solvent for use in the absorption column; and
the hydrogen containing gas stream is dried and then separated into the first hydrogen containing fuel gas stream and the second hydrogen containing fuel gas stream.

6. The method of claim 1, wherein the carbon monoxide and steam contained in the reformed stream is reacted in a high temperature water-gas shift reactor and a low temperature water-gas shift reactor in flow communication with the high temperature water-gas shill reactor.

7. The method of claim 6, wherein the hydrocarbon containing stream is heated through indirect heat exchange with a partly shifted stream discharged from the high temperature water-gas shift reactor to the low temperature water-gas shift reactor.

\* \* \* \* \*